United States Patent [19]

Yoshinaga et al.

[11] Patent Number: 5,473,448

[45] Date of Patent: Dec. 5, 1995

[54] DISPLAY DEVICE HAVING A MESOMORPHIC DIFFRACTION GRATING LAYER ADJACENT A POLYMER DISPERSED LAYER

[75] Inventors: Kazuo Yoshinaga, Machida; Hajime Sakata, Atsugi; Yomishi Toshida, Yokohama; Toshikazu Ohnishi, Machida; Koichi Sato, Atsugi; Takeo Eguchi, Tokyo; Tsuyoshi Shibata, Yokohama, all of Japan

[73] Assignee: Canon Kabushiki Kaisha, Tokyo, Japan

[21] Appl. No.: 408,200

[22] Filed: Mar. 21, 1995

Related U.S. Application Data

[63] Continuation of Ser. No. 32,290, Mar. 17, 1993, abandoned.

[30] Foreign Application Priority Data

Mar. 18, 1992 [JP] Japan .................................. 4-091518

[51] Int. Cl.[6] .............................. G02F 1/13; G02F 1/133; G02F 1/137
[52] U.S. Cl. .............................. 359/51; 359/52; 359/53; 359/95
[58] Field of Search ............................. 359/51, 52, 53, 359/94, 95

[56] References Cited

U.S. PATENT DOCUMENTS

| | | | |
|---|---|---|---|
| 4,251,137 | 2/1981 | Knop et al. | 350/347 V |
| 4,367,924 | 1/1983 | Clark et al. | 359/100 |
| 4,411,495 | 10/1983 | Beni et al. | 350/347 V |
| 4,435,047 | 3/1984 | Fergason | 350/334 |
| 4,707,080 | 11/1987 | Fergason | 350/334 |
| 4,729,640 | 3/1988 | Sakata | 350/348 |
| 4,850,681 | 7/1989 | Yamanobe et al. | 350/348 |
| 4,995,705 | 2/1991 | Yoshinaga et al. | 359/100 |
| 5,011,623 | 4/1991 | Yoshinaga et al. | 252/299.5 |
| 5,059,000 | 10/1991 | Kaneko et al. | 350/351 |
| 5,066,107 | 11/1991 | Yoshinaga et al. | 359/45 |
| 5,141,785 | 8/1992 | Yoshinada et al. | 428/1 |
| 5,148,302 | 9/1992 | Nagano et al. | 359/95 |
| 5,194,973 | 3/1993 | Isogai et al. | 359/51 |
| 5,296,952 | 3/1994 | Takatsu et al. | 359/52 |
| 5,299,289 | 3/1994 | Omae et al. | 359/51 |

FOREIGN PATENT DOCUMENTS

| | | |
|---|---|---|
| 0313053 | 4/1989 | European Pat. Off. . |
| 0512397 | 11/1992 | European Pat. Off. . |
| 53-003928 | 2/1978 | Japan . |
| 53-031727 | 9/1978 | Japan . |
| 56-107216 | 8/1981 | Japan . |
| 63-271233 | 11/1988 | Japan . |
| 01198725 | 8/1989 | Japan . |

OTHER PUBLICATIONS

M. Schadt & W. Helfrich, Applied Physics Letters, vol. 18, No. 4, Feb. 15, 1971, pp. 127–128.

V. P. Shibaev et al., Polymer Communications, vol. 24, No. 12, Dec. 12, 1983, pp. 364–365.

J. W. Doane, et al., Society for Information Display International Symposium Digest of Technical Papers, vol. 21, May 15–17, 1990, pp. 224–226.

Patent Abstracts of Japan, vol. 012, No. 144 (P-697), JP-A-62 264 028, May 1988.

*Primary Examiner*—William L. Sikes
*Assistant Examiner*—Ron Trice
*Attorney, Agent, or Firm*—Fitzpatrick, Cella, Harper & Scinto

[57] ABSTRACT

A display device is constituted by disposing a first display layer and a second display layer between a pair of electrode plates including at least one transparent electrode plate. The first display layer contains a low-molecular weight mesomorphic compound dispersed in or impregnating a polymer matrix. The second display layer is formed by disposing a diffraction grating and being filled with the low-molecular weight mesomorphic compound. The display device is incorporated in a display apparatus to effect a good display with a high contrast ratio.

24 Claims, 5 Drawing Sheets

DISPLAY DEVICE HAVING A MESOMORPHIC DIFFRACTION GRATING LAYER ADJACENT A POLYMER DISPERSED LAYER

This application is a continuation of application Ser. No. 08/032,290, filed Mar. 17, 1993, now abandoned.

FIELD OF THE INVENTION AND RELATED ART

The present invention relates to a thermo-optical and electro-optical display device utilizing transmitted light and scattered light, particularly to a display device including a display layer comprising a specific porous polymer film material and a low-molecular weight mesomorphic compound, a display apparatus using the device and a display method using the device.

Liquid crystal materials have been used for various thermo-optical and electro-optical display devices. These display devices have now been actively developed because of a low driving voltage and low energy consumption.

Hitherto, liquid crystal devices have been used as an electro-optical device in various fields. Most liquid crystal devices which have been put into practice use TN (twisted nematic) type liquid crystals, as shown in "Voltage-Dependent Optical Activity of a Twisted Nematic Liquid Crystal" by M. Schadt and W. Helfrich "Applied Physics Letters" Vol. 18, No. 4 (Feb. 15, 1971) pp. 127–128.

These devices employing TN type liquid crystals, however, had a problem that the number of scanning lines (or picture elements) have been restricted since crosstalk was caused to occur when the devices was driven by utilizing a multiplex driving scheme using a matrix electrode structure wherein scanning electrodes and signal electrodes were arranged in a matrix on condition that a density of a picture element was increased.

To overcome the drawback of the above-mentioned liquid crystal devices, the use of liquid crystal devices utilizing bistability has been proposed by Clark and Lagerwall (e.g. Japanese Laid-Open Patent Appln. No. 56-107216, U.S. Pat. No. 4,367,924, etc.). In this instance, as the liquid crystals having bistability, ferroelectric liquid crystals having chiral smectic C-phase (SmC*) or H-phase (SmH*) are generally used.

Such a ferroelectric liquid crystal (hereinafter sometimes abbreviated as "FLC") has a high-speed responsiveness due to spontaneous polarization thereof and also shows a bistability with a memory characteristic. The FLC is considered a suitable material for a display device having a high density of a picture element and a large picture area since the FLC is further excellent in a view-angle characteristic in addition to the above properties. The FLC, however, involves a technical problem that a display device having a large picture area is not necessarily produced easily since it is difficult to provide a monodomain over a large picture area when a liquid crystal cell is actually prepared.

In order to produce a display device of a large area easily, there have been suitably used polymeric or polymer liquid crystals. As an example of a liquid crystal display system using a polymeric liquid crystal, it is possible to raise a polymeric liquid crystal display device of a thermal writing-type as disclosed in Polymer Communications, Vol. 24, p.p. 364–365, "Thermotropic Liquid Crystalline Polymers 14" by V. Shibaev, S. Kostromin, N. Plate, S. Ivanov, V. Vestroy and I. Yakovlev.

The above-described system, however, involves several problems such as high energy consumption and a delay in response accompanying the use of a polymeric liquid crystal when an electric field is applied, so that it has not been put to practical use.

There has been known a liquid crystal device utilizing a light scattering property given by employing a display layer comprising a liquid crystal impregnating a porous glass (Japanese Patent Publication (JP-B) No. 31727/1978). However, the above device has not been commercially used due to difficulty in injecting the liquid crystal or preparing a cell structure. There have also been known liquid crystal devices utilizing a light scattering property given by forming a diffraction grating on a substrate ((JP-B) No. 3928/1978 and U.S. Pat. No. 4,251,137). These devices have encountered problems such that: effects of the diffraction grating is insufficient; the resulting contrast becomes low; and unevenness or irregularity is liable to occur when the diffraction grating is formed.

There has been proposed a liquid crystal device containing a porous cellulose-type polymer matrix comprising, and a liquid crystal impregnating the porous polymer matrix (U.S. Pat. No. 4,411,495). The liquid crystal device controls a transparent and scattering states by utilizing a difference in a refractive index between the porous polymer matrix and the liquid crystal. However, the liquid crystal device failed to provide a sufficient contrast and also provided an undesirably high threshold voltage.

U.S. Pat. No. 4,435,047 to Manchester R & D Partnership discloses a liquid crystal device containing an encapsulated low-molecular weight mesomorphic compound (or liquid crystal) dispersed in polyvinyl alcohol as a polymer matrix. Further, U.S. Pat. No. 4,707,080 discloses a liquid crystal device containing a low-molecular weight mesomorphic compound in a connected tubular form dispersed in a polymer matrix. There has also been proposed a liquid crystal device containing a low-molecular weight mesomorphic compound dispersed in a polymer liquid crystal used as a polymer matrix (J. W. Doane, J. L. West, J. B. Whitehead, Jr., D. S. Fredley, "Wide-Angle-View PDLC Displays", 1990 Society for Information Display International Symposium Digest of Technical Papers, Lecture No. 12, 5, p.p. 224–226, May (1990)). The above device brought about improvements in a viewing angle and a scattering degree.

The above-mentioned devices suitable for easily providing liquid crystal devices of a large area have faster response speeds than those of the conventional devices containing a nematic or cholesteric polymer liquid crystal. The devices also have good light transmittance and are not required to use a polarizer.

However, the above-mentioned devices containing the low-molecular weight liquid crystal dispersed and held in the polymer matrix had an insufficient interfacial alignment-controlling force, so that it was difficult to obtain a desirable threshold voltage for matrix driving. As a result, the devices have a drawback in providing a high resolution system although it could provide a large area. Further, as a method for an optical modulation, the devices utilizes a light scattering property due to a difference in refractive index between the low-molecular weight liquid crystal and the polymer matrix, but it has been difficult to obtain a sufficient refractive index difference. As a result, the devices require considerably thick display layers for effecting sufficient cut-off of light and for providing high contrast.

The above-mentioned devices are liable to provide an unstable interfacial state because an interface between the polymer matrix and low-molecular weight mesomorphic compound is formed at preparation of a display device, and the polymer matrix fails to provide a clear interfacial alignment-controlling force compared with a polyimide alignment film having been subjected to rubbing. As a result, hysteresis with respect to light transmittance is observed when an applied driving voltage is changed upward and downward, thus resulting in deterioration in an image quality, contrast, etc. when it is required to provide a gradation display for, e.g., TV. Moreover, the devices have a difficulty in employing a thin film transistor (TFT) due to a high driving voltage.

In order to reduce the driving voltage, some liquid crystal devices wherein a content of a liquid crystal component is increased or a diameter of droplets of a low-molecular weight mesomorphic compound is controlled by polymerizing a mixture of the low-molecular weight mesomorphic compound and a polymerizable monomer resulting in a polymer matrix have been proposed (e.g., Japanese Laid-Open Patent Application (JP-A) Nos. 502128/1986; 271233/1988; and 198725/1989 corresponding to EP-A313053). The above devices, however, have been encountered problems such as a difficulty in controlling physical properties including strength of a polymer matrix and a decreased electrical resistance or a deterioration in durability under the influence of inclusion of impurities in the monomer or a polymerizing catalyst with the low-molecular weight mesomorphic compound.

In order to solve the above problems, there have been proposed some liquid crystal devices employing a polymer matrix having a strong alignment-controlling force and high strength. Such a polymer matrix is constituted by a polymer material having a high polymerization degree, sufficiently crosslinked structure, or a high glass transition point. However, such a polymer matrix is liable to provide a high threshold voltage of the device and it is difficult to increase a content of a liquid crystal (or mesomorphic compound) since the polymer matrix has the above-mentioned strong alignment-controlling force, whereby light transmittance of a display layer of the device is decreased.

SUMMARY OF THE INVENTION

The present invention has been accomplished in order to remedy the above-mentioned drawbacks of the conventional liquid crystal devices.

An object of the present invention is to provide a liquid crystal display device capable of containing a large amount of a low-molecular weight mesomorphic compound, effecting good display with a high transmittance and a high contrast and having a decreased driving voltage.

Another object of the present invention is to provide a display apparatus and a display method employing the display device described above.

According to the present invention, there is provided a display device, comprising: a pair of electrode plates each comprising a substrate and an electrode thereon including at least one substrate having thereon a transparent electrode, and a first display layer and a second display layer disposed between the electrode plates; wherein the first display layer comprises a polymer matrix and a low-molecular weight mesomorphic compound dispersed in the polymer matrix, and the second display layer comprises a diffraction grating and a low-molecular weight mesomorphic compound.

According to the present invention, there is also provided a display apparatus, including: the display device described above; means for applying voltage to the display device; means for illuminating the display device with light; means for projecting transmitted light passed through the display device onto a projection image-receiving member.

The present invention provides a display apparatus, including: a display device, comprising: a pair of electrode plates each comprising a substrate and an electrode thereon including at least one substrate having thereon a transparent electrode, and a first display layer and a second display layer disposed between the electrode plates; wherein the first display layer comprises a polymer matrix and a low-molecular weight mesomorphic compound dispersed in the polymer matrix, and the second display layer comprises a diffraction grating and the low-molecular weight mesomorphic compound; means for applying voltage to the display device; means for separating light emitted by a light source into light fluxes having three primary colors and projecting the light fluxes to the display device, thereby separating the light fluxes into transmitted light fluxes and scattered light fluxes through the display device; and means for projecting the transmitted light fluxes onto a screen.

The present invention also provides a display method, comprising: illuminating the above display device described above with light, applying an electric field to the display device, and projecting transmitted light obtained by passing the light through the display device to effect display.

These and other objects, features and advantages of the present invention will become more apparent upon a consideration of the following description of the preferred embodiments of the present invention taken in conjunction with the accompanying drawings.

DETAILED DESCRIPTION OF THE INVENTION

Figure 1:
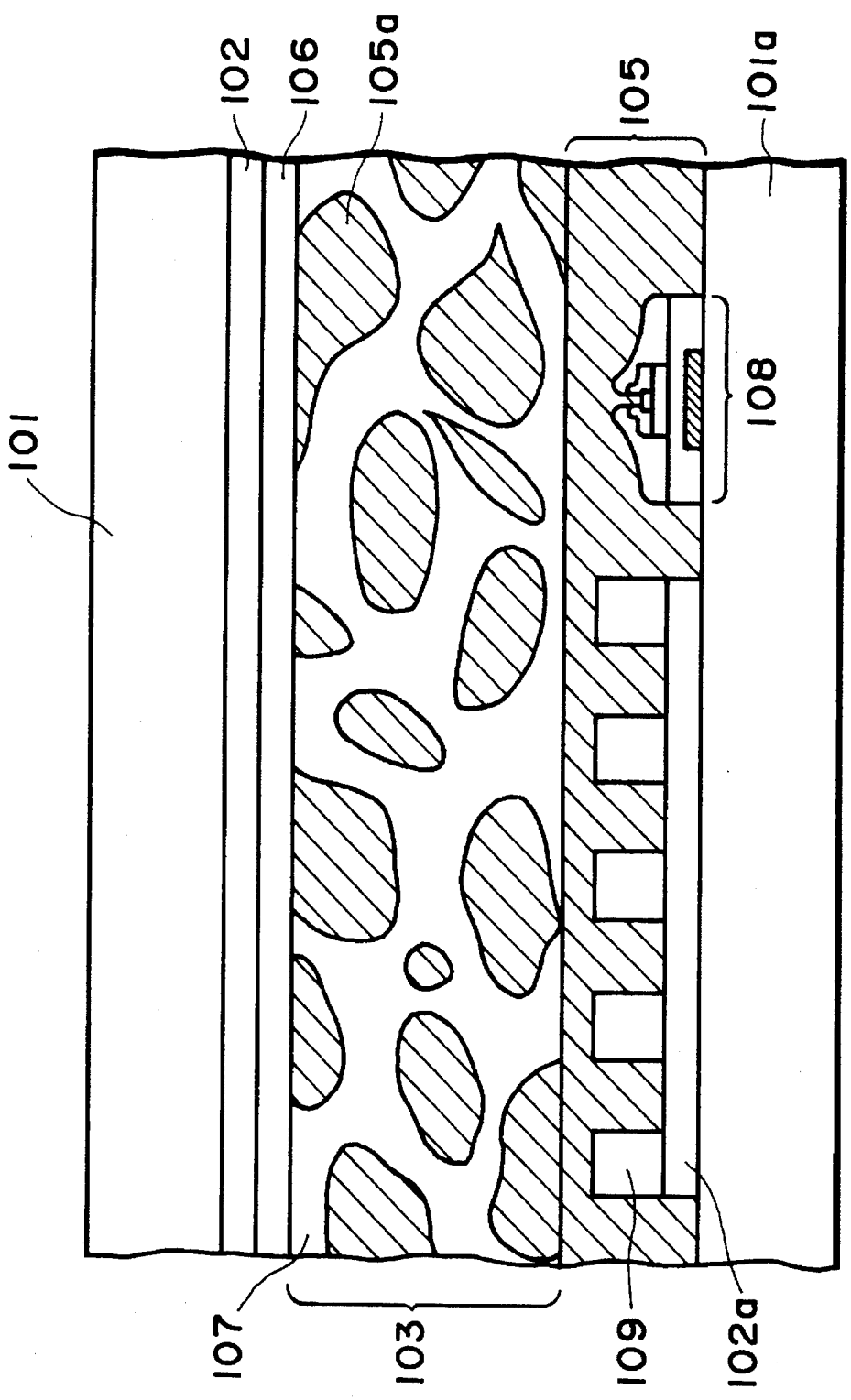
FIG. 1 is a schematic sectional view showing an embodiment of the display device according to the present invention.

The display device according to the present invention is characterized by a first display layer and a second display layer disposed between a pair of electrode plates wherein the first display layer comprises a polymer matrix and a low-molecular weight mesomorphic compound dispersed in the polymer matrix, and the second display layer comprises a diffraction grating and the low-molecular weight mesomorphic compound.

In the second display layer, concavities or recesses of the diffraction grating are filled with the low-molecular weight mesomorphic compound, particularly a nematic liquid crystal. As a result, the display device including such a second display layer provides good display images having a high contrast even when a total thickness of the first and second display layers is decreased. The decreased total thickness of the display layers is effective in providing a practical display device driven at a low applied voltage and having a good light transmittance.

In the first display layer, the polymer matrix possesses a property of scattering light by regulating an orientation or alignment of liquid crystal molecules. By increasing a diameter of the liquid crystal molecules, it is possible to improve a light transmittance or decrease a threshold voltage. However, a display device including only a first display layer as a display layer is required to have a thickness of the first display layer or a further decreased driving voltage when the display device is driven at a low applied voltage, particularly in a driving scheme of using a thin film transistor (TFT). When a decreased thickness of a display layer was employed, it has been difficult to retain a sufficient scattering state, thus increasing transmitted light in a scattering state to decrease a contrast.

In the present invention, since the first display layer is used in combination with the above-mentioned second display layer including the diffraction grating filled with the low-molecular weight mesomorphic compound, it is possible to decrease a zero-order transmitted light and thus to obtain a good contrast even when the display device has a decreased thickness of the first and second display layers.

The diffraction grating used in the present invention has an unevenness or concavo-convex pattern. The convex part of the diffraction grating may preferably have a refractive index substantially equal to a refractive index $n_\perp$ (i.e., a refractive index of a plane perpendicular to a liquid crystal molecule axis) of the low-molecular weight mesomorphic compound. When the low-molecular weight mesomorphic compound has a negative dielectric anisotropy, the convex part of the diffraction grating may have a refractive index substantially equal to a refractive index $n_{//}$ of the low-molecular weight mesomorphic compound (i.e., a refractive index of a plane parallel to a liquid crystal molecule axis).

The low-molecular weight mesomorphic compound may preferably be aligned homogeneously (i.e., homogeneous alignment) to the surface of the diffraction grating or the substrate when an electric field is not applied. In this instance, a refractive index of a material constituting the diffraction grating is different from a refractive index of the low-molecular weight mesomorphic compound to provide a difference in a refractive index, thus generating a diffraction of a transmitted light. At this time, the diffraction grating may be disposed on a substrate of an incident light side or a substrate of a transmitted light side depending upon an alignment characteristic of a scattered light in the first and second display layer used. It is possible to form a diffraction grating on both substrates.

FIGS. 6A–6E show schematic sectional views of a diffraction grating used in the present invention.

Figure 6A:
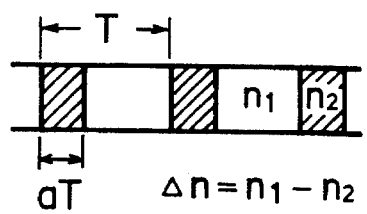
FIGS. 6A to 6E are schematic sectional views showing some embodiments of a diffraction grating for use in the display device of the present invention.
Figure 6B:
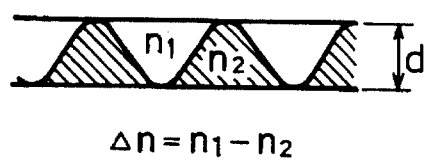
Figure 6C:
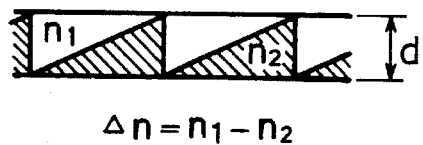
Figure 6D:
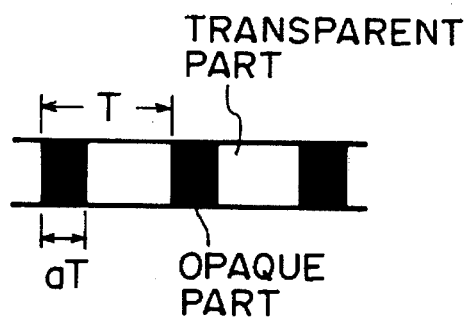
Figure 6E:
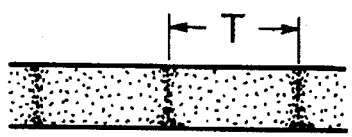

Referring to FIGS. 6A–6C, the diffraction gratings are those of a phase modulation-type free from light absorption, thus providing a high diffraction efficiency compared with those of an amplitude modulation-type as shown in FIGS. 6D and 6E.

The phase modulation-type diffraction gratings includes: a phase modulation-type step grating as shown in FIG. 6A; a phase modulation-type sinusoidal grating as shown in FIG. 6B; and a phase modulation-type blazed grating as shown in FIG. 6C. The amplitude modulation-type diffraction gratings include an amplitude modulation-type step grating as shown in FIG. 6D and an amplitude modulation-type sinusoidal grating as shown in FIG. 6E.

The diffraction efficiency is controlled by a difference in a refractive index between a low-molecular weight mesomorphic compound (or liquid crystal) used and a diffraction grating used, and by selection of a thickness of the diffraction grating. The difference of the refractive indices and the thickness of the diffraction grating are set in order to decrease or minimize a zero-order transmitted light. In the present invention, the difference of the refractive indices may preferably be at least 0.01. Below 0.01, the diffraction grating is required to have a large thickness. Further, the thickness of the diffraction grating may preferably be 0.1–20 µm. Below 0.1 µm, it is difficult to obtain a sufficient diffraction efficiency. Above 20 µm, it is difficult to prepare or process a device cell.

When a high-order diffraction light is generated frequently by using a diffraction grating, the diffraction grating may preferably be formed on a substrate of a transmitted light side. The above-mentioned phase modulation-type blazed grating as shown in FIG. 6C is used for selectively generating only a first-order diffraction light. When the blazed grating is used to provide a small angle of diffraction, it is possible to form the blazed grating on a substrate of an incident light side.

The diffraction grating used in the present invention may have a grating constant (i.e., the distance between the centers or the prescribed positions of consecutive grooves of the diffraction grating) of 0.8–10 µm, particularly 0.8–8 µm. Below 0.8 µm, an angle of diffraction with respect to a diffraction light becomes too large, thus failing to generate diffraction. Above 10 µm, an angle of diffraction becomes small, thus failing to obtain a sufficient contrast.

Figure 2:
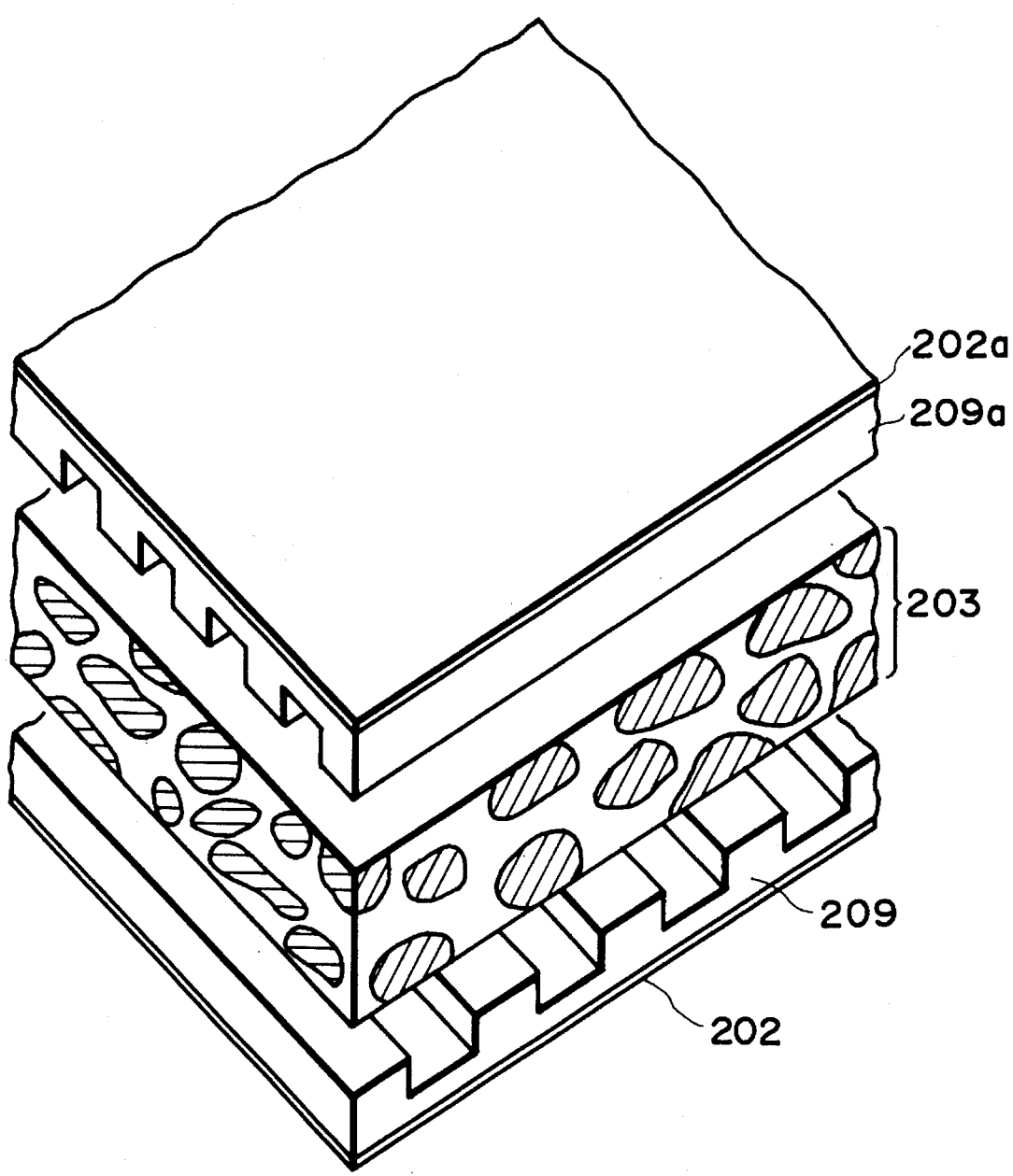
FIG. 2 is a schematic view showing another embodiment of display device of the present invention.
Figure 3:
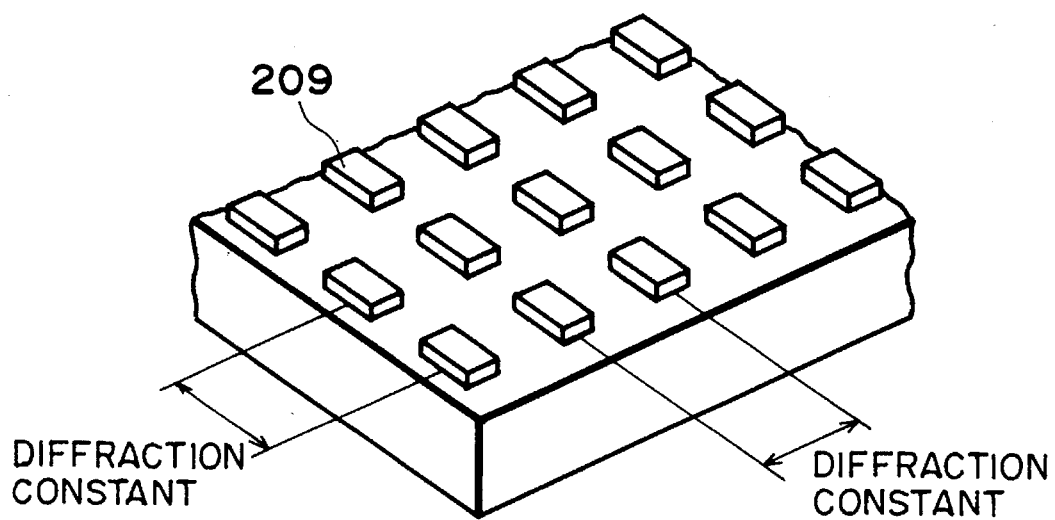
FIG. 3 is a schematic view of an embodiment of a diffraction grating for use in the display device according to the present invention.
Figure 4:
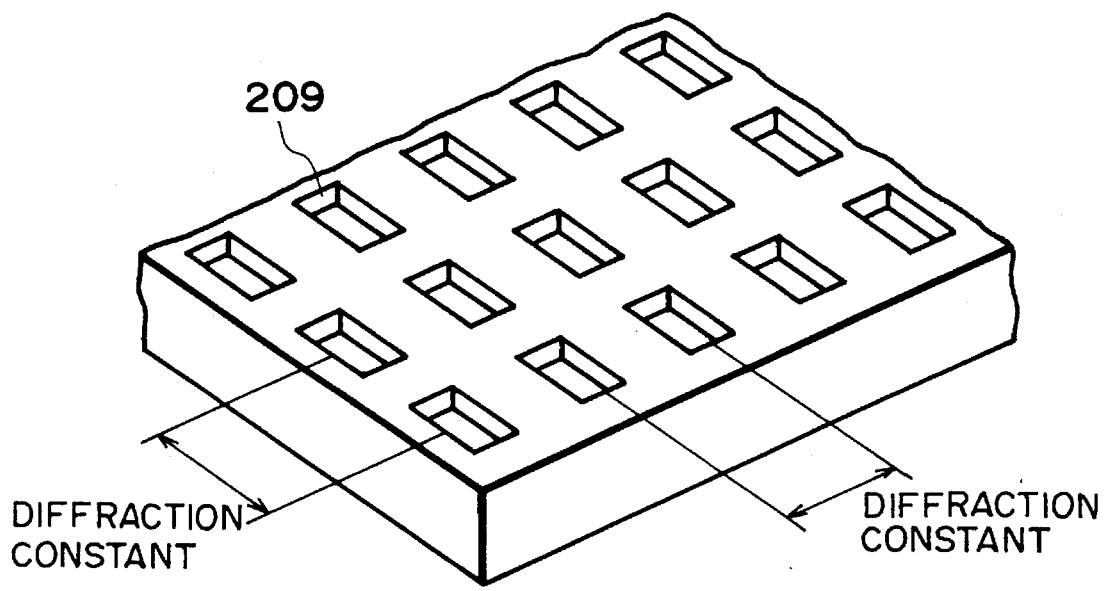
FIG. 4 is a schematic view of another embodiment of a diffraction grating for use in the liquid crystal device according to the present invention.

The diffraction grating used in the present invention may have various shapes such as stripes including line/space as shown in FIG. 2, a two-dimensional grating shape (or a two-dimensional form) as shown in FIG. 4 and a shape of an island (or a square shape) as shown in FIG. 3. When an incident light is not polarized light and a low-molecular weight mesomorphic compound is uniaxially aligned, two stripe diffraction gratings are disposed so that their stripes are perpendicular to each other, thus effectively utilizing both planes of polarization (as shown in FIG. 2). It is also possible to effectively use a diffraction grating in the form of cross stripes or a square on the same substrate.

When the low-molecular weight mesomorphic compound filling concavities of the diffraction grating has a random alignment characteristic, it is possible to use a stripe diffraction grating in case where a difference between an average refractive index of the low-molecular weight mesomorphic compound and an refractive index of the diffraction grating exists.

Hereinbelow, the present invention will be explained in more detail with reference to the drawings.

FIG. 1 is a schematic sectional view of an embodiment of the display device of the present invention for explanation of the structure thereof.

Referring to FIG. 1, the display device includes a first display layer 103 comprising a low-molecular weight mesomorphic compound 105a and a polymer matrix 107, and a second display layer including a low-molecular mesomorphic compound 105, a diffracting grating 109 and a thin film transistor (TFT) 108. The first display layer 103 and the second display layer are disposed between a pair of substrates 101 and 101a each having thereon an electrode 102 or 102a. An adhesive layer 106 is formed on the electrode 102.

Each of the substrates 101 and 101a may comprise glass or plastics, e.g., in the form of plate or film.

Examples of a polymer film used as the substrate may include: a low-density polyethylene film, a high-density polyethylene film (such as "Hibron", a product of Mitsui Toatsu Kagaku K.K.), a polyester film (such as "Torefan", a product of Toray K.K.), a polyester film (such as "Myler", a product of Du Pont), a polyvinyl alcohol film (such as "Hicellon", a product Nihon Gosei Kako K.K.), a polyamide film (such as "Rayfan", product of Toyo Gosei Film K.K.), a polycarbonate film (such as "Teijin Panlight", a product of Teijin K.K.) a polyimide film (such as "KAPTON", a product of Du Pont), a polyvinyl chloride film (such as "Hishilex", a product of Mitsubishi Jushi K.K.), a polytetrafluoroethylene film (such as "Teflon", a product of Mitsui Fluorochemical K.K.), a polyacrylate film (such as "Sumilate", a product of Sumitomo Bakelite K.K.), a polystyrene film (such as "Styrosheet", a product of Asahi Dow K.K.), a polyvinylidene chloride film (such as "Saran Film", a product of Asahi Dow K.K.), a cellulose film, a polyvinylidene fluoride film (such as "Tedler", a product of Du Pont) and a polyethersulfone film (such as "Sumilite" a product of Sumitomo Bakelite K.K.).

The electrodes 102 and 102a formed on the substrates may include a transparent electrode comprising ITO (indium-tin-oxide) or $SnO_2$, and a metal film comprising Al, Au, Ag, Cu or Cr. In the present invention, either one or both of the electrodes 102 and 102a comprises the transparent electrode. It is possible to use the electrodes as an electrode and a reflective layer in a reflection-type display device. The thus prepared substrates with the electrodes may be inclusively referred to herein as "electrode plates".

In this embodiment, an alignment control layer may be formed on the electrode plates.

The alignment control layer formed on the substrate 101 or 101a with the electrode 102 or 102a thereon may include: inorganic materials such as silicon monoxide, silicon dioxide, aluminum oxide, zirconia, magnesium fluoride, cerium oxide, cerium fluoride, silicon nitride, silicon carbide, and boron nitride; and organic materials such as polyvinyl alcohol, polyimide, polyamide-imide, polyester-imide, polyparaxylylene, polyester, polycarbonate, polyvinyl acetal, polyvinyl chloride, polyamide, polystyrene, cellulose resin, melamine resin, urea resin, acrylic resin, and epoxy resin. Each of the alignment control layers may be formed by rubbing a film of the inorganic or organic material described above with velvet, cloth or paper in one direction so as to provide a uniaxial alignment characteristic. Further, it is possible to compose the alignment control layer of two layers, e.g., by forming a layer of the inorganic material and forming thereon a layer of an organic material. In still another embodiment, it is possible to form an alignment control layer on a substrate by oblique vapor deposition with the inorganic material such as SiO or $SiO_2$. It is also possible to impart an alignment-controlling effect to a substrate such as one comprising glass or plastic by effecting oblique etching after providing an inorganic or organic material on the substrate.

The alignment control layer may preferably be used also as an insulating layer. Accordingly, the thickness of the alignment control layer may generally have 100 Å–1 micron, preferably 500–5000 Å. The insulating layer also has the advantage of preventing current conduction due to a trace impurity in the first and second display layers, whereby the display layers little deteriorate even in a repetitive operation. In the present invention, the alignment control layers may be formed on the both transparent electrodes 102 and 102a, respectively.

In FIG. 1, the diffraction grating 109 is formed on the electrode 102a and then a low-molecular weight mesomorphic compound 105 is injected into concavities of the diffraction grating to provide the second display layer. The second display layer may include the TFT 108 formed on the substrate 101a. The thus-prepared second display layer provides a good contrast. A refractive index of the diffraction grating 109 is set so as to match an refractive index $n_\perp$ of the low-molecular weight mesomorphic compound.

Materials for the diffraction grating 109 may include: organic materials such as a photoresist, a thermoplastic resin and a thermopolymerizable resin; and inorganic materials such as $SiO_2$, glass and $MgF_2$.

In the above materials, the photoresist may preferably be used. More specifically, the photoresist may include: those of various types such as a novolak-type, an acrylate-type, a chlorinated polystyrene-type, a polysiloxane-type, a polyimide-type, and a polyvinyl alcohol-type. The photoresist may also be a negative-type or a positive-type. The photoresist can be obtained from, e.g., Tokyo Ohka Kogyo K.K. (trade name: ODUR series or OEBR series).

The diffraction grating may be formed by etching a photoresist formed on the electrode. When the inorganic material such as $SiO_2$ is used, a prescribed pattern is formed on a 0.1 to 5 μm-thick $SiO_2$ layer (which has a uniform thickness) by using a photoresist, etc., followed by etching to prepare a diffraction grating.

The first display layer 103 may be formed on the electrode 102 through the adhesive layer 106 or by directly applying a polymer matrix 107 such as a polymer or a porous polymer film having open pores and then filling a space communicating air with the low-molecular weight mesomorphic compound.

The polymer matrix 107 constituting the first display layer 103 may be formed by dispersing or dissolving a polymer and a low-molecular weight mesomorphic compound in an appropriate solvent and applying the resultant coating liquid to the electrode plate (or the adhesive layer) and then drying. The polymer matrix 107 may also be formed by impregnating a porous polymer film having open pores with the low-molecular weight mesomorphic compound. In the present invention, a method of forming a state of the low-molecular weight mesomorphic compound dispersed in the polymer matrix may include the above two methods.

In preparation of the porous polymer film for the polymer matrix 107, it is possible to use various methods wherein: a polymer is dispersed into a liquid and the like; phase separation through polymerization of monomer or prepolymer is conducted; a dispersion of a polymer, an inorganic material, liquid, etc. is formed into film and then the inorganic material and the liquid are removed or extracted from the resultant film; a dynamic process such as stretching is performed; and fibrous or granular polymer s formed into a porous polymer. Among them, the dynamic process such as stretching may preferably be used in view of high strength or exclusion of impurities.

A thickness of the first display layer 103 may generally be 0.5–100 microns, preferably 1–50 microns. Below 0.5 micron, it is difficult to obtain sufficient contrast. On the other hand, above 100 microns, it is difficult to drive the liquid crystal device at high speed as a large driving voltage is required.

In the embodiment, the first display layer 103 disposed between the electrode plates may preferably comprise a porous polymer film as the polymer matrix 107 and a low-molecular weight mesomorphic compound impregnating the porous polymer film.

In the first display layer 103, the porous polymer film constitutes a continuous matrix and the low-molecular weight mesomorphic compound 105a is dispersed therein in any shapes including spheres or spheroids or further irregularly elongated shapes like bars. A diameter of the dispersed low-molecular weight mesomorphic compound may preferably be 0.1–10 microns, more preferably 0.5–5 microns. Outside the range of 0.1–10 microns, it is difficult to obtain sufficient scattering, thus failing to provide a good contrast. Herein, for the shapes other than the sphere, the above diameter means a diameter of a shorter axis of the dispersed low-molecular weight mesomorphic compound when approximated to a spheroid or a cylindrical bar.

In a preferred embodiment of the present invention, the first display layer 103 comprising the porous polymer film impregnated with the low-molecular weight mesomorphic compound may be applied to the electrode plate by the medium of the adhesive layer 106. A thickness of the adhesive layer may preferably be 0.05–10 μm, particularly 0.1–3 μm. Below 0.05 μm, the resultant adhesive layer fails to provide a sufficient adhesion effect. Above 10 μm, an effective applied electric field is decreased.

The reflection layer used in the present invention may include a metal films comprising a metal such as Al, Au or Ag and a dielectric mirror. The thickness of the reflection layer may generally be 0.01–100 μm, preferably 0.05–10 μm.

In the present invention, it is possible to dispose the TFT 108 on the substrate as shown in FIG. 1.

In the present invention, the polymer matrix 107 may include: a water-soluble polymer such as polyvinyl alcohol, gelatin or polyethylene oxide; and a polymer obtained through photopolymerization or thermopolymerization of a monomer or a prepolymer of acrylate-type, methacrylate-type, epoxy-type, etc. The polymer matrix 107 may also include the porous polymer film having open pores.

Examples of the porous polymer film used in the first display layer may include: a polyethylene film, a polypropylene film, a polycarbonate film, a polyvinyl chloride film, a polytetrafluoroethylene film, and a polyvinylidene fluoride film. The porous polymer film material 104 has open pores which can communicate matter such as a solid, liquid or gas. In order to obtain sufficient open pores (or a porosity), the porous polymer film may preferably have a weight-average molecular weight (Mw) of at least 50,000. Below 50,000, the porous polymer film has an insufficient film strength when it has a high porosity, thus failing to provide stable properties such as heat resistance and durability.

A porosity of the porous polymer film is an important factor in view of an increase in a content (or a volume fraction) of the low-molecular weight mesomorphic compound. Herein, the porosity is obtained through the following equation of:

$$\text{Porosity (\%)} = [(X-Y)/(\text{volume of polymer film}) \times (\text{specific gravity of liquid})] \times 100 \quad (1)$$

wherein X denotes a weight of a polymer film impregnated with a liquid having a known specific gravity and Y denotes a weight of the polymer film alone.

In the first display layer, the porous polymer film is used in combination with the low-molecular weight mesomorphic compound which is incompatible with the porous polymer film. The porosity of the porous polymer film may be 80–98%, preferably 85–95%. Below 80%, a driving voltage is liable to increase. On the other hand, above 98%, it is difficult to prepare the display device due to insufficient strength of the polymer film, thus resulting in a deterioration in durability, heat resistance, etc. The porosity (%) substantially corresponds to a volume fraction (or volume percentage) (%) of the low-molecular weight mesomorphic compound in the first display layer because the porous polymer film has open pores. Accordingly, the volume fraction of the low-molecular weight mesomorphic compound may be 80–98%, preferably 85–95%.

The porous polymer film used in the present invention may preferably have a surface energy of 20 dyn/cm or below. When the porous polymer film having a surface energy of at most 20 dyn/cm is used in combination with the low-molecular weight mesomorphic compound for constituting the first display layer, the low-molecular weight mesomorphic compound in a random orientation state shows a good perpendicular orientation characteristic (i.e., mesomorphic compound molecules are oriented perpendicularly to a spherical or tubular droplet wall) in the neighborhood of an interface clearly formed between the low-molecular weight mesomorphic compound and the porous polymer film, under no voltage application. As a result, the mesomorphic compound presumably assumes two orientation states of the perpendicular orientation and random orientation, whereby a good scattering state may be realized. When a voltage is applied, the low-molecular weight mesomorphic compound responds to the applied voltage to show a uniform orientation to a substrate, whereby a transparent state is obtained to provide a good contrast. Further, when the applied voltage is removed, the low-molecular weight mesomorphic compound quickly responds to the removal of the voltage application to show an original scattering state due to the good perpendicular orientation characteristic imparted by the porous polymer film. The display device according to the present invention shows a good threshold characteristic with no hysteresis because the perpendicular orientation characteristic of the low-molecular weight mesomorphic compound is very stable.

The porous polymer film used in the present invention may preferably be prepared by stretching a porous or non-porous polymer film. The stretched polymer film has a high porosity, thus showing an alignment-controlling effect to the low-molecular weight mesomorphic compound. As a result, the low-molecular weight mesomorphic compound effectively responds to an applied electric field to provide a transparent state.

In the present invention, the low-molecular weight mesomorphic compound used in the first display layer may be identical to or different from, preferably identical to, one used in the second display layer.

Then, specific examples of the low-molecular weight mesomorphic compound used in the present invention may include those represented by the following structural formulas, which are shown below together with phase transition characteristics.

Herein, the respective symbols denote the following phases:

Cryst.: crystal,
SmC*: chiral smectic C phase,
SmA: smectic A phase,
SmB: smectic B phase,
SmC: smectic C phase, SmE: smectic E phase,
SmF: smectic F phase,
SmG: smectic G phase,
Sm3: un-identified smectic phase, Ch.: cholesteric phase,
N: nematic phase, and
Iso.: isotropic phase.

Chiral smectic mesomorphic compound

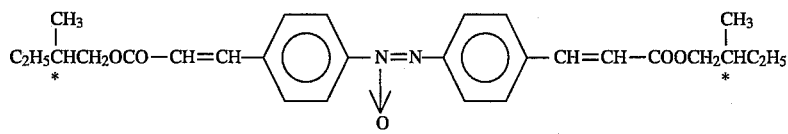
(I-1)

4,4-azoxycinnamic acid-bis(2-methylbutyl)ester

Cryst. $\xrightleftharpoons{121°\text{ C.}}$ SmC* $\xrightleftharpoons{134°\text{ C.}}$ SmA $\xrightleftharpoons{168°\text{ C.}}$ Iso.

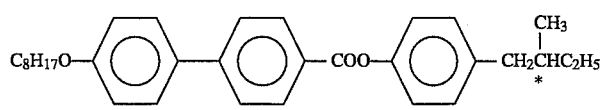
(I-2)

4-(2'-methylbutyl)phenyl-4'-octyloxybiphenyl-4-carboxylate

Cryst. $\xrightleftharpoons{78°\text{ C.}}$ Sm3 $\xrightleftharpoons{80°\text{ C.}}$ SmC* $\xrightleftharpoons{128.3°\text{ C.}}$ SmA $\xrightleftharpoons{171°\text{ C.}}$ Ch. $\xrightleftharpoons{174.2°\text{ C.}}$ Iso.

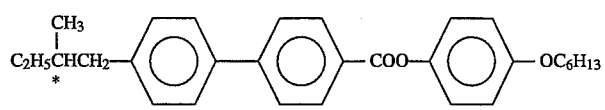
(I-3)

4-hexyloxyphenyl-4-(2''-methylbutyl)biphenyl-4'-carboxylate

Cryst. $\xrightleftharpoons{68.8°\text{ C.}}$ SmC* $\xrightleftharpoons{80.2°\text{ C.}}$ Ch. $\xrightleftharpoons{163.5°\text{ C.}}$ Iso.

(I-4)

4-octyloxyphenyl-4-(2''-methylbutyl)biphenyl-4'-carboxylate

Cryst. $\xrightleftharpoons{76°\text{ C.}}$ SmC* $\xrightleftharpoons{88.6°\text{ C.}}$ Ch. $\xrightleftharpoons{155.4°\text{ C.}}$ Iso.

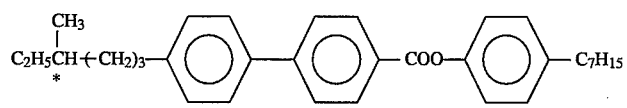
(I-5)

4-heptylphenyl-4-(4''-methylhexyl)biphenyl-4'-carboxylate

Cryst. $\xrightleftharpoons{91.5°\text{ C.}}$ SmC* $\xrightleftharpoons{93°\text{ C.}}$ SmA $\xrightleftharpoons{112°\text{ C.}}$ Ch. $\xrightleftharpoons{131°\text{ C.}}$ Iso.

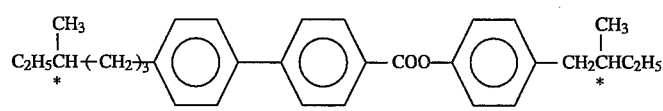
(I-6)

4-(2''-methylbutyl)phenyl-4-(4''-methylhexyl)-biphenyl-4'-carboxylate

Cryst. $\xrightarrow{83.4°\text{ C.}}$ Ch. $\xrightarrow{114°\text{ C.}}$ Iso.

SmC* $\xleftarrow{74.3°\text{ C.}}$ SmA $\xleftarrow{81.0°\text{ C.}}$

-continued
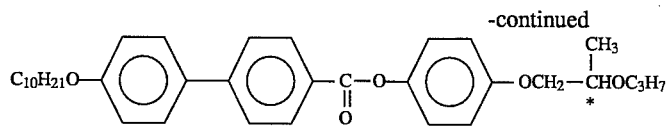
(I-7)
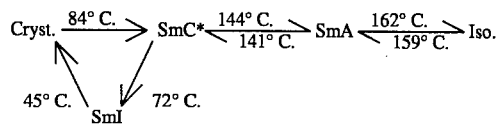
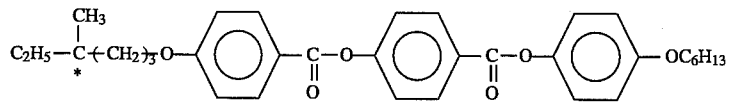
(I-8)
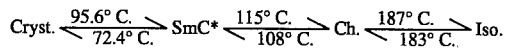
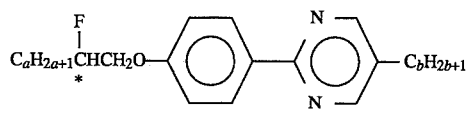
(I-9)
a = 4–12, b = 8–16  (Case where a = 6, b = 12)
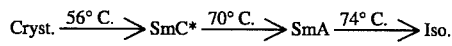
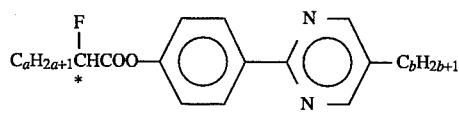
(I-10)
a = 4–12, b = 8–16  (Case where a = 8, b = 10)
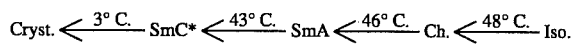
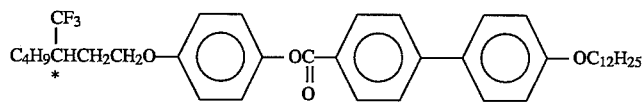
(I-11)
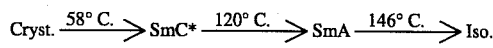
Non-chiral smectic mesomorphic compound
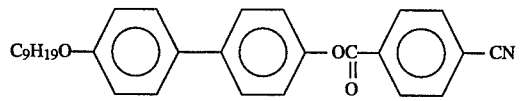
(I-12)
4′-n-nonyloxy-4-biphenyl-4-cyanobenzoate   Iso. ⟶ N. ⟶ SmC
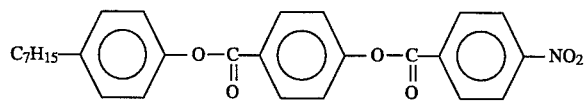
(I-13)
4-n-heptylphenyl-4-(4′-nitrobenzoyloxy)benzoate   Iso. ⟶ N. ⟶ SmA
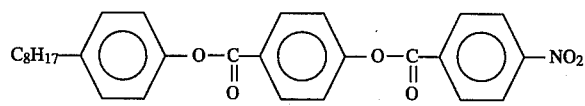
(I-14)
4-n-octylphenyl-4-(4′-nitrobenzoyloxy)benzoate   Iso. ⟶ N. ⟶ SmA ⟶ SmC -continued

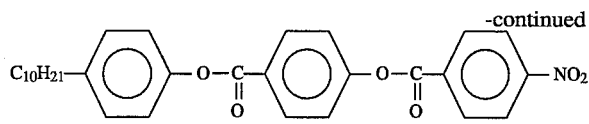 (I-15)

4-n-decylphenyl-4-(4'-nitrobenzoyloxy)benzoate   Iso. ⟶ N. ⟶ SmA ⟶ SmC

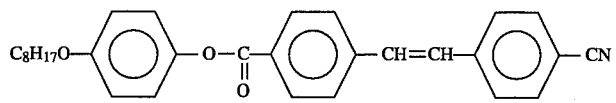 (I-16)

trans-4-(4"-octyloxybenzoyloxy)-4'-cyanostilbene   Iso. ⟶ SmA₁ ⟶ N. ⟶ SmA₂

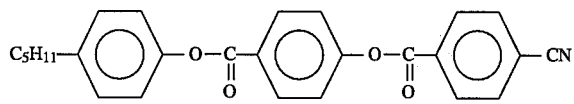 (I-17)

4-n-pentylphenyl-4-(4'-cyanobenzoyloxy)benzoate   Iso. ⟶ N. ⟶ SmA

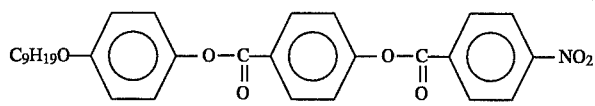 (I-18)

4-n-nonyloxyphenyl-4-(4'-nitrogenzoyloxy)benzoate   Iso. ⟶ N. ⟶ SmA ⟶ SmC

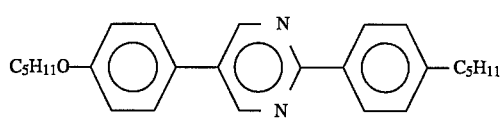 (I-19)

2-(4'-n-pentylphenyl)-5-(4"-n-pentyloxyphenyl)-pyrimidine   Iso. ⟶ SmA ⟶ SmC ⟶ SmF ⟶ SmG

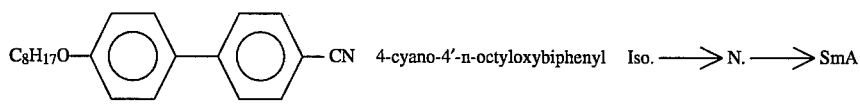 (I-20)

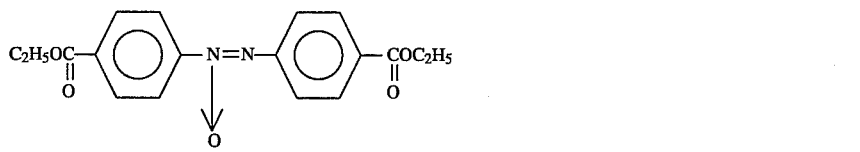 (I-21)

diethyl p,p'-azoxydibenzoate   Iso. ⟶ SmA

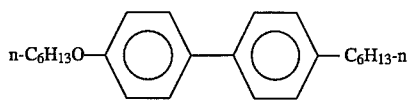 (I-22)

4-n-hexyl-4'-n-hexyloxybiphenyl   Iso. ⟶ SmB ⟶ SmE

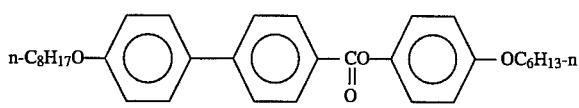 (I-23)

4-n-hexyloxyphenyl-4'-n-octyloxybiphenyl-4-carboxylate

Iso. ⟶ N. ⟶ SmA ⟶ SmC ⟶ SmB

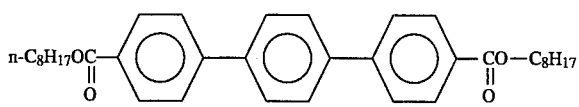 (I-24)

di-n-octyl-4,4"-terphenyl dicarboxylate Iso. ⟶ SmA ⟶ SmC

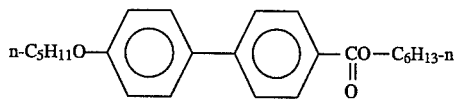 (I-25)

n-hexyl-4'-n-pentyloxybiphenyl-4-carboxylate

Iso. ⟶ SmA ⟶ SmB ⟶ SmE

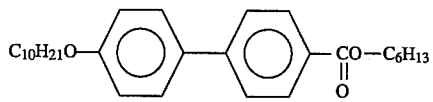 (I-26)

4-n-hexyl-4'-n-decyloxybiphenyl-4-carboxylate Iso. ⟶ SmA ⟶ SmC

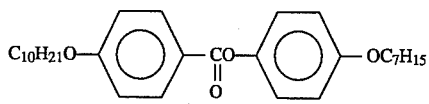 (I-27)

4-n-heptyloxyphenyl-4-n-decyloxybenzoate Iso. ⟶ SmA ⟶ SmC

Nematic mesomorphic compound (or nematic liquid crystal)

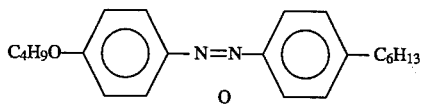 (I-28)

4-hexyl-4'-butyloxyazobenzene Iso. ⇌ (90° C.) N. ⇌ (27° C.) Cryst.

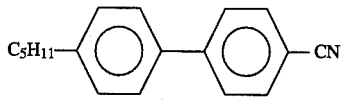 (I-29)

4-cyano-4'-pentylbiphenyl Iso. ⇌ (35° C.) N. ⇌ (24° C.) Cryst.

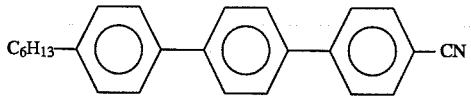 (I-30)

4-cyano-4'-hexylterphenyl Iso. ⇌ (228° C) N. ⇌ (125° C.) Cryst.

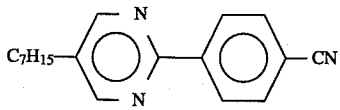 (I-31)

heptylcyanophenyl pyrimidine Iso. ⇌ (50° C.) N. ⇌ (44° C.) Cryst.

Z-1625 (mfd. by Merck Co.) Nematic temperature range = −10 to 60° C. (I-32)
E-7 (mfd. by BDH Co.) Nematic temperature range = −10 to 60° C. (I-33)
R-200 (mfd. by Rosch Co.) Nematic temperature range = 0 to 65° C. (I-34)
D-X01A (mfd. by Dainippon Ink K.K.) Nematic temperature range = −26 to 68° C. (I-35)

ZLI-2008 (mfd. by Merck Co.) $T_{cl}$ (clearing point) = 64° C. Sm ⟶ (<−20° C.) N (I-36)

ZLI-1840 (mfd. by Merck Co.) $T_{cl}$ = 90° C. Sm ⟶ (<−20° C.) N (I-37)

TN403 (mfd. by Dainippon Ink K.K.) $T_{cl}$ = 82° C. Sm ⟶ (<−20° C.) N (I-38)

E7 (mfd. by EM Chemicals Co.) (I-39)

In the present invention, a nematic mesomorphic compound (or liquid crystal) having a positive dielectric anisotropy may preferably be used as the low-molecular weight mesomorphic compound.

In the present invention, it is also possible to effect display by heating with a thermal head or laser light.

Examples of laser light may include: gas lasers such as He-Ne gas laser, $Ar^{2+}$ gas laser and $N_2$ gas laser; solid-state lasers such as ruby laser, glass laser and YAG laser; and semiconductor lasers. Among these lasers, a semiconductor laser having a wavelength of 600–1600 nm, particularly 600–900 nm may preferably be used. Further, it is possible to provide a lasers having a shorter wavelength by employing a second harmonic or third harmonic of these lasers.

When the laser light is used, the liquid crystal device further comprises a light absorption layer containing a laser light-absorbing substance or comprises a display layer dispersing or dissolving therein a laser light-absorbing substance. The laser light-absorbing substance may desirably show no absorption property in the region of visible light in view of a bad influence of the substance on a display surface.

Examples of such a laser light-absorbing substance may include: azo compounds, bisazo compounds, trisazo compounds, anthraquinone compounds, naphthoquinone compounds, phthalocyanine compounds, naphthalocyanine compounds, tetrabenzoporphyrin compounds, ammonium salt compounds, diimmonium salt compounds, and metal chelate compounds.

Among the laser light-absorbing substances, a substance for use in a semiconductor laser shows an absorption property in the region of near infrared ray and is usable for a stable light-absorbing dye. Such a substance also has a good compatibility with or dispersibility in the low-molecular weight mesomorphic compound. It is possible to obtain a thermally stable guest-host type memory or display medium by mixing a light-absorbing substance showing dichroism with the low-molecular weight mesomorphic compound.

The above-mentioned light-absorbing substances may be used singly or in combination of two or more species.

The substance may also be used in combination with another near infrared ray-absorbing dye or another dichroic dye.

Examples of such a near infrared ray-absorbing dye may include those such as cyanine, merocyanine, phthalocyanine, tetrahydrocholine, dioxazine, anthraquinone, triphenothiazine, xanthene, triphenylmethane, pyrilium, croconium, azulene and triphenylamine.

The above-mentioned light-absorbing substance is contained in the low-molecular weight mesomorphic compound in a proportion of 0.1–20%, preferably 0.5–10%.

Figure 5:
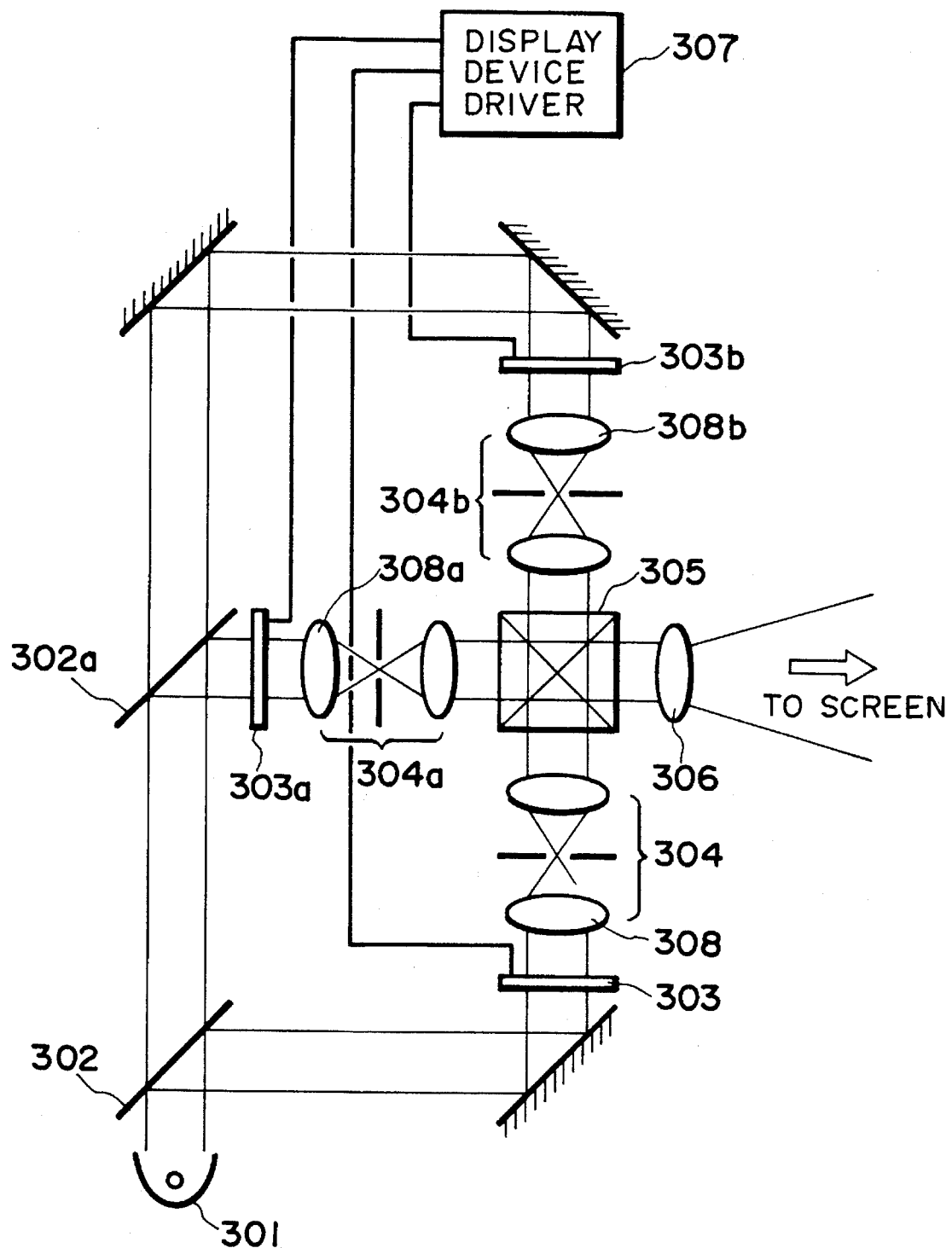
FIG. 5 is an explanatory view of a display apparatus employing the display device according to the present invention.

FIG. 5 shows an explanatory view of an embodiment of the display apparatus of the present invention. The display apparatus is a full-color projection-type display apparatus employing a schlieren optical system.

Referring to FIG. 5, white light emitted by a light source unit 301 is separated into light fluxes having three primary colors of R (red), G (green) and B (blue) by dichloic mirrors 302, 302a and 302b to be projected to liquid crystal devices 303, 303a and 303b. A non-selected picture element in the device is turned into a white scattering state to scatter the incident light and a selected picture element is allowed to transmit the incident light. The transmitted light fluxes and the scattered light fluxes are separated by schlieren optical systems 304, 304a and 304b including schlieren lenses 308, 308a and 308b, and then are combined by a dichloic prism 305 to be projected onto a projection image-receiving member such as a screen (not shown) through a projection lens 306, whereby good full-color images can be obtained. The liquid crystal devices 303, 303a and 303b are supplied with voltage by a driving unit 307 for driving the liquid crystal devices. The liquid crystal devices in this embodiment can employ a simple matrix system or a non-linear optical device, but may more preferably be a type comprising a thin film transistor (TFT) as a switch for each picture element in view of display contrast, response speed and gradation display.

Hereinbelow, the present invention will be explained in more detail with reference to Examples.

EXAMPLE 1

Onto a 1.1 mm-thick glass substrate having thereon a vapor-deposited layer comprising a 1000 Å-thick ITO, a coating liquid formed by dissolving or dispersing 10 g of polyvinyl alcohol (Mw (weight-average molecular weight)= 110000, manufactured by Aldrich Co.) and 10 g of a negative liquid crystal ZLI-2008 (Example Compound No. (I-36), manufactured by E. Merck Co.) in 80 g of water was applied by bar coating, followed by drying to provide a 8 μm-thick a first display layer on the substrate.

Separately, an electron beam resist (OEBR-100, manufactured by Tokyo Ohka Kogyo K.K.) was applied onto a 1.1 mm-thick glass substrate having thereon a vapor-deposited layer comprising a 1000 Å-thick ITO to provide a 2 μm-thick resist layer. A two-dimensional diffraction grating having 1.5 μm-line and 1.5 μm-space on x- and y-axes and having a grating constant of 3 μm as shown in FIGS. 4 and 6A was formed by treating the above-prepared resist layer by an electron beam lithographic apparatus (ELS-3300 LB (II), manufactured by Erionics Co.).

The thus prepared diffraction grating was subjected to rubbing with an acetate fiber-planted cloth. The glass substrate having the diffraction grating was applied to the above-prepared glass substrate having the first display layer at the periphery of the substrates with an adhesive containing glass fiber spacers (10 μmø, FP-100S, manufactured by Nippon Denki Garasu K.K.) dispersed in an epoxy resin (Stract Bond EH-454-NF, manufactured by Mitsui Toatsu Kagaku K.K.) to prepare a cell.

Into the above-prepared cell, a nematic liquid crystal (composition) ZLI-2008 (Example Compound No. (I-36) manufactured by Merck Co.) was injected by a capillary-rise method under reduced pressure, followed by restoration to normal pressure to effect filling of a gap or space of the cell with the liquid crystal ZLI-2008, whereby a second display layer was formed to prepare a display device or a liquid crystal device.

The display device was subjected to pulse voltage application (rectangular waveform of 60 Hz and ±40 V), whereby the first and second display layers changed from a scattering state (under no voltage application) into a transparent state to provide a high contrast of 38:1 and a low threshold voltage of 5.3 V. The display device also provided a light transmittance of 78%.

Herein, a threshold voltage (V) denotes a voltage required for providing a transmittance change of 10% when a difference in light transmittance between the most transmitted (transparent) state and the most scattered (scattering) state is represented by 100.

COMPARATIVE EXAMPLE 1

A display device was prepared in the same manner as in Example 1 except that a diffraction grating was not used.

The display device was subjected to pulse voltage application (rectangular waveform of 60 Hz and ±40 V), whereby the first and second display layers changed from a scattering state (under no voltage application) into a transparent state to provide a contrast of 12:1 and a threshold voltage of 5.1 V. The display device provided a light transmittance of 77%.

COMPARATIVE EXAMPLE 2

A display device was prepared in the same manner as in Example 1 except that 8 μmø-glass fiber spacers (FP-80S, manufactured by Nippon Denki Garasu K.K.) were used instead of the 10 μmø-glass fiber spacers and the nematic liquid crystal for constituting the second display layer was not used.

The display device was evaluated in the same manner as in Example 1 to provide a contrast of 6:1 and a threshold voltage of 4.9 V.

EXAMPLES 2 AND 3 AND COMPARATIVE EXAMPLES 3 AND 4

Display devices were prepared and evaluated in the same manner as in Example 1 except that a grating constant of a diffraction grating was changed to those indicated in Table 1 below, respectively. The results are also shown in Table 1.

TABLE 1

|  | Grating constant (μm) | Contrast | Threshold voltage (V) | Transmittance (%) |
|---|---|---|---|---|
| Ex. 2 | 1.5 | 42:1 | 5.8 | 65 |
| Ex. 3 | 5 | 20:1 | 5.2 | 70 |
| Comp. Ex. 3 | 0.7 | 10:1 | 6.2 | 55 |
| Comp. Ex. 4 | 12 | 12:1 | 5.1 | 71 |

EXAMPLE 4

Onto a 1.1 mm-thick substrate comprising a green glass (available from Matsuzaki Sinku K.K.) having thereon a vapor-deposited layer comprising a 2000 Å-thick ITO, an epoxy-type adhesive (Stract Bond, EH-454NF, mfd. by Mitsui Toatu Kagaku K.K.) was applied and then a 50 micron-thick porous film (Hipore 3000, manufactured by Asahi Kasei Kogyo K.K.; porosity=90%) was laminated on the resultant substrate, followed by heating for adhesion.

Then, the above-prepared substrate was impregnated or saturated with a solution of polystyrene (Mw=280,000 and Tg=100° C.; mfd. by Aldrich Co.) in benzene, followed by drying and curing. The porous film was ground by means of a grinder to provide a thickness (i.e., a thickness of a first display layer) of 8 microns and then was subjected to ultrasonic cleaning with benzene to remove the polystyrene.

Separately, onto a 1.1 mm-thick glass substrate having thereon a vapor-deposited layer comprising a 1000 Å-thick ITO, a coating liquid formed by dissolving or dispersing 10 g of polyvinyl alcohol (Mw (weight-average molecular weight)=110000, manufactured by Aldrich Co.) and 10 g of a negative liquid crystal ZLI-2008 (Example Compound No. (I-36), manufactured by E. Merck Co.) in 80 g of water was applied by bar coating, followed by drying to provide a 8 μm-thick a first display layer on the substrate.

Separately, an electron beam resist (OEBR-100, manufactured by Tokyo Ohka Kogyo K.K.) was applied onto a 1.1 mm-thick glass substrate having thereon a vapor-deposited layer comprising a 1000 Å-thick ITO to provide a 2 μm-thick resist layer. A two-dimensional diffraction grating having 1.5 μm-line and 1.5 μm-space on x- and y-axes and having a grating constant of 3 μm as shown in FIGS. 4 and 6A was formed by treating the above-prepared resist layer by an electron beam lithographic apparatus (ELS-3300 LB (II), manufactured by Erionics Co.).

The thus prepared diffraction grating was subjected to rubbing with an acetate fiber-planted cloth. The glass substrate having the diffraction grating was applied to the above-prepared glass substrate having the first display layer at the periphery of the substrates with an adhesive containing glass fiber spacers (10 μmø, FP-100S, manufactured by Nippon Denki Garasu K.K.) dispersed in an epoxy resin (Stract Bond EH-454-NF, manufactured by Mitsui Toatsu Kagaku K.K.) to prepare a cell.

Into the above-prepared cell, a nematic liquid crystal (composition) ZLI-2008 (Example Compound No. (I-36) manufactured by Merck Co.) was injected by a capillary-rise method under reduced pressure, followed by restoration to normal pressure to effect filling of a gap or space of the cell with the liquid crystal ZLI-2008, whereby a second display layer was formed to prepare a display device or a liquid crystal device.

The display device was subjected to pulse voltage application (rectangular waveform of 60 Hz and ±40 V), whereby the first and second display layers changed from a scattering state (under no voltage application) into a transparent state to provide a high contrast of 33:1 and a low threshold voltage of 6.4 V. The display device also provided a light transmittance of 43%.

COMPARATIVE EXAMPLE 5

A display device was prepared and evaluated in the same manner as in Example 1 except that the first display layer was not used. The display device provided a contrast of 6:1, a light transmittance of 83%, and a threshold voltage of 4.4 V.

As described hereinabove, according to the present invention, there is provided a display device including a first display layer comprising a low-molecular weight mesomorphic compound dispersed in or impregnating a polymer matrix, and a second display layer. By disposing a diffraction grating in the second display layer, the display device provides a decreased total thickness of the first and second display layers and a good display with a high contrast even when a driving voltage is set to a low level. The display device also provides an excellent light transmittance by decreasing a total thickness of the first and second display layers.

A display apparatus and display method employing the above display device are effective for providing good images having a high contrast and a good transmittance even at a decreased driving voltage.

What is claimed is:

1. A display device, comprising: a pair of electrode plates each comprising a substrate and an electrode thereon including at least one substrate having thereon a transparent electrode, and a first display layer and a second display layer disposed between the electrode plates; wherein said first display layer comprises a polymer matrix and a low-molecular weight mesomorphic compound dispersed in the polymer matrix, and said second display layer comprises a diffraction grating and a low-molecular weight mesomorphic compound.

2. A display device according to claim 1, wherein said diffraction grating has a grating constant of 0.8 to 10 microns.

3. A display device according to claim 1, wherein said polymer matrix comprises a porous polymer film having open pores.

4. A display device according to claim 1, wherein said diffraction grating has a two-dimensional form.

5. A display device according to claim 1, wherein said low-molecular weight mesomorphic compound in said first display layer comprises a nematic liquid crystal.

6. A display device according to claim 1, wherein said low-molecular weight mesomorphic compound in said first display layer comprises a chiral smectic mesomorphic compound.

7. A display device according to claim 1, wherein said low-molecular weight mesomorphic compound in said first display layer comprises a non-chiral smectic mesomorphic compound.

8. A display device according to claim 1, wherein said low-molecular weight mesomorphic compound in said second display layer comprises a nematic liquid crystal.

9. A display device according to claim 1, further comprising a third display layer, said third molecular layer comprising a diffraction grating and a low-molecular weight mesomorphic compound, wherein said first display layer is disposed between said second and third display layers.

10. A display device according to claim 9, wherein each of said two diffraction gratings have a stripe shape including lines and spaces, and are disposed such that their stripes are perpendicular to each other.

11. A display device according to claim 1, wherein said diffraction grating has a stripe shape including lines and spaces.

12. A display apparatus, including:
a display device according to any one of claims 1–5;
means for applying voltage to said display device;
means for illuminating said display device with light;
means for projecting transmitted light passed through said display device onto a projection image-receiving member.

13. A display method, comprising: illuminating a display device according to any one of claims 1–5 with light; applying voltage to said display device; and projecting transmitted light obtained by passing said light through said display device to effect display.

14. A display apparatus, including:
a display device, comprising: a pair of electrode plates each comprising a substrate and an electrode thereon including at least one substrate having thereon a transparent electrode, and a first display layer and a second display layer disposed between the electrode plates; wherein said first display layer comprises a polymer matrix and a low-molecular weight mesomorphic compound dispersed in the polymer matrix, and said second display layer comprises a diffraction grating and a low-molecular weight mesomorphic compound;
means for applying voltage to the display device;
means for separating light emitted by a light source into light fluxes having three primary colors and projecting the light fluxes to the display device, thereby separating the light fluxes into transmitted light fluxes and scattered light fluxes through the display device; and
means for projecting the transmitted light fluxes onto a screen.

15. A display device according to claim 14, wherein said diffraction grating has a grating constant of 0.8 to 10 microns.

16. A display device according to claim 14, wherein said polymer matrix comprises a porous polymer film having open pores.

17. A display device according to claim 14, wherein said diffraction grating has a two-dimensional form.

18. A display device according to claim 14, wherein said low-molecular weight mesomorphic compound in said first display layer comprises a nematic liquid crystal.

19. A display device according to claim 14, wherein said low-molecular weight mesomorphic compound in said first display layer comprises a chiral smectic mesomorphic compound.

20. A display device according to claim 14, wherein said low-molecular weight mesomorphic compound in said first display layer comprises a non-chiral smectic mesomorphic compound.

21. A display device according to claim 14, wherein said low-molecular weight mesomorphic compound in said second display layer comprises a nematic liquid crystal.

22. A display device according to claim 14, further comprising a third display layer, said third molecular layer comprising a diffraction grating and a low-molecular weight mesomorphic compound, wherein said first display layer is disposed between said second and third display layers.

23. A display device according to claim 22, wherein each of said two diffraction gratings have a stripe shape including lines and spaces, and are disposed such that their stripes are perpendicular to each other.

24. A display device according to claim 14, wherein said diffraction grating has a stripe shape including lines and spaces.

* * * * *

UNITED STATES PATENT AND TRADEMARK OFFICE
CERTIFICATE OF CORRECTION

PATENT NO. : 5,473,448

DATED : December 5, 1995

INVENTOR(S): KAZUO YOSHINAGA, ET AL.

It is certified that error appears in the above-identified patent and that said Letters Patent is hereby corrected as shown below:

On title page, item [56]

REFERENCES CITED

Foreign Patent Documents, "01198725" should read --1-198725--.

COLUMN 1

Line 33, "was" should read --were--.

COLUMN 2

Line 58, "utilizes" should read --utilize--.

COLUMN 3

Line 22, "been" should be deleted.

COLUMN 4

Line 39, "display" should read --the display--.

COLUMN 5

Line 53, "layer" should read --layers--.

Line 63, "includes:" should read --include:--

UNITED STATES PATENT AND TRADEMARK OFFICE
CERTIFICATE OF CORRECTION

PATENT NO. : 5,473,448

DATED : December 5, 1995

INVENTOR(S): KAZUO YOSHINAGA, ET AL.

It is certified that error appears in the above-identified patent and that said Letters Patent is hereby corrected as shown below:

COLUMN 6

Line 64, "diffracting" should read --diffraction--.

COLUMN 7

Line 9, "Myler", should read --"Mylar",--;

Line 14, "K.K.) a" should read --K.K.), a--;

Line 24, "Sumilite" should read --"Sumilite",--; and

Line 64, "have" should read --be--.

COLUMN 8

Line 11, "an" should read --an average--; and

Line 57, "s" shoud read --is--.

COLUMN 9

Line 28, "a" (first occurrence) should be deleted.

COLUMN 10

Line 55, "Then, specific" should read --Specific--.

UNITED STATES PATENT AND TRADEMARK OFFICE
CERTIFICATE OF CORRECTION

PATENT NO. : 5,473,448

DATED : December 5, 1995

INVENTOR(S) : KAZUO YOSHINAGA, ET AL.

It is certified that error appears in the above-identified patent and that said Letters Patent is hereby corrected as shown below:

COLUMN 11

Line 4, "un-identified" should read --unidentified--.

COLUMN 17

Example I-28, "$\overset{N=N}{O}$" should read ----.

COLUMN 19

Line 13, "lasers" should read --laser--;

Line 57, "dichloic" should read --dichroic--; and

Line 65, "dichloic" should read --dichroic--.

Signed and Sealed this

Twenty-first Day of May, 1996

Bruce Lehman

BRUCE LEHMAN

Attesting Officer — Commissioner of Patents and Trademarks